(12) United States Patent
Somani et al.

(10) Patent No.: US 10,866,131 B2
(45) Date of Patent: Dec. 15, 2020

(54) SYSTEMS AND METHODS FOR REFERENCE VOLUME FOR FLOW CALIBRATION

(71) Applicant: Flow Devices and Systems Inc., Yorba Linda, CA (US)

(72) Inventors: Bhushan Somani, Yorba Linda, CA (US); Eric J. Redemann, Walnut Creek, CA (US)

(73) Assignee: FLOW DEVICES AND SYSTEMS INC., Yorba Linda, CA (US)

( * ) Notice: Subject to any disclaimer, the term of this patent is extended or adjusted under 35 U.S.C. 154(b) by 0 days.

(21) Appl. No.: 16/334,323

(22) PCT Filed: Sep. 19, 2017

(86) PCT No.: PCT/US2017/052355
§ 371 (c)(1),
(2) Date: Mar. 18, 2019

(87) PCT Pub. No.: WO2018/053550
PCT Pub. Date: Mar. 22, 2018

(65) Prior Publication Data
US 2019/0204127 A1    Jul. 4, 2019

Related U.S. Application Data (60) Provisional application No. 62/396,807, filed on Sep. 19, 2016, provisional application No. 62/396,808, (Continued)

(51) Int. Cl.
*G01F 15/02* (2006.01)
*G01F 1/40* (2006.01)
(Continued)

(52) U.S. Cl.
CPC .............. *G01F 15/028* (2013.01); *G01F 1/40* (2013.01); *G01F 1/42* (2013.01); *G01F 1/48* (2013.01);
(Continued)

(58) Field of Classification Search
CPC ... G01F 15/02; G01F 1/40; G01F 1/42; G01F 1/48; G01F 1/68
See application file for complete search history.

(56) References Cited

U.S. PATENT DOCUMENTS 4,056,975 A * 11/1977 LeMay ................. G01F 1/6847
73/202.5
4,562,744 A     1/1986 Hall et al.
(Continued)

FOREIGN PATENT DOCUMENTS

CN    105159360 A    12/2015
CN    105526996 A     4/2016
(Continued)

OTHER PUBLICATIONS

Chinese Application No. 201780057491.5, Chinese Office Action and Search Report, dated Jun. 11, 2020.

*Primary Examiner* — Jewel V Dowtin
(74) *Attorney, Agent, or Firm* — Mahesh Law Group PC; Kumar Maheshwari (57) ABSTRACT

A reference volume for use with pressure change flow rate measurement apparatus has an internal structure comprising elements with cross section and length comparable to the cross section and length of adjacent interstitial fluid regions. The reference volume may have one or more heat conduction elements exterior to and in good thermal contact with a corrosion resistant material that defines the internal fluid holding region.

18 Claims, 10 Drawing Sheets

Related U.S. Application Data filed on Sep. 19, 2016, provisional application No. 62/396,809, filed on Sep. 19, 2016.

(51) Int. Cl.

| | | |
|---|---|---|
| *G01F 1/42* | (2006.01) | |
| *G01F 1/50* | (2006.01) | |
| *G01F 15/14* | (2006.01) | |
| *G01F 15/00* | (2006.01) | |
| *G05D 7/06* | (2006.01) | |
| *G01F 1/48* | (2006.01) | |
| *G01F 1/692* | (2006.01) | |
| *G01F 1/88* | (2006.01) | |
| *G01F 25/00* | (2006.01) | |

(52) U.S. Cl.
CPC ............... *G01F 1/50* (2013.01); *G01F 1/692* (2013.01); *G01F 1/88* (2013.01); *G01F 15/00* (2013.01); *G01F 15/002* (2013.01); *G01F 15/005* (2013.01); *G01F 15/02* (2013.01); *G01F 15/14* (2013.01); *G01F 25/0038* (2013.01); *G05D 7/0635* (2013.01); *G05D 7/0641* (2013.01); *G05D 7/0688* (2013.01)

(56) References Cited

U.S. PATENT DOCUMENTS

| | | | | |
|---|---|---|---|---|
| 4,672,997 A | * | 6/1987 | Landis | ............... G01F 1/6847 137/554 |
| 6,543,297 B1 | | 4/2003 | Kleven | |
| 7,946,186 B2 | | 5/2011 | Hoecker | |
| 8,104,340 B2 | * | 1/2012 | Speldrich | ............... G01F 1/72 73/202.5 |
| 2004/0083807 A1 | * | 5/2004 | Mudd | ............... G01F 1/88 73/204.21 |

FOREIGN PATENT DOCUMENTS

| | | |
|---|---|---|
| CN | 105917198 A | 8/2016 |
| WO | 2011039593 A1 | 4/2011 |
| WO | WO 2011/039593 | 4/2011 |

* cited by examiner

SYSTEMS AND METHODS FOR REFERENCE VOLUME FOR FLOW CALIBRATION

PRIORITY CLAIM AND RELATED APPLICATIONS

This application is the National Stage application of International application No. PCT/US17/052355, which claims the benefit of U.S. Provisional Patent Application No. 62/396,809, filed Sep. 19, 2016, entitled as "System and Methods for Reference Volume for Flow Calibration", U.S. Provisional Patent Application No. 62/396,808, filed on Sep. 19, 2016, entitled as System, Apparatus and Methods for Variable Restriction for Flow Measurements and U.S. Provisional application No. 62/396,807, filed on Sep. 19, 2016, entitled as apparatus and Methods for Self-Correcting Pressure based mass flow controller, which are each incorporated herein by reference in their entirety.

FIELD

The present disclosure generally relates to determining the flow rate of a fluid by measuring a temperature and a pressure of the fluid. Fluid as used herein is intended to encompass materials which are in a gaseous phase because of specific combinations of pressure and temperature. The invention is more particularly related to a containment used with a pressure-volume-temperature (PVT) method of determining flow rates.

BACKGROUND

Determining the flow rate of a gaseous fluid by considering a time rate of change among one or more variables may be used. Devices using a combination of pressure, temperature, and volume, are common and often referred to as using a PVT method. Typically, the device design is intended to hold two of those characteristics constant while allowing the third to vary. Some devices, such as a bell prover or a piston prover, are designed to hold the gas pressure and temperature constant during a measuring time interval while allowing a contained volume to change. Other devices, such as rate-of-rise (ROR) and rate-of-fall (ROF) apparatus, are designed to hold the gas temperature and volume constant during a measuring time interval while allowing the pressure to change within a contained volume. All such flow measuring devices inherently have limitations in the success at holding intended characteristics constant and limitations at measuring all variables, including the time interval. Measurement uncertainties arising from these limitations form the primary constraints on the eventual accuracy of the determined flow rate.

In rate-of-rise and rate-of-fall apparatus an increasing or decreasing quantity of gaseous fluid is contained within a volume that is notionally constant during a measuring time interval. This constant volume for containing the measured fluid has been variously called a "reference volume," or a "standard volume," or a "known volume." This disclosure usually calls the subject constant volume a "reference volume" but other similar terminology may be used. The reference volume is remarked to be notionally constant because subtleties concerning the opening and closing of valves and other aspects of apparatus design can affect the observed size of a reference volume but those subtleties are not the primary focus of this disclosure. In semiconductor capital equipment (sometimes referred to as "tools") a reference volume may be comprised of one or more individual tank assemblies, or distributed as plumbing among various portions of a tool, or a combination of plumbing and tanks.

Flow rate determination methods based upon pressure change (ROR or ROF) in a reference volume typically require the fluid temperature to remain constant during the measurement time interval. Maintaining isothermal conditions avoids having to deal with a time varying equation of state, and conveniently reduces most of the equation's mathematical partial derivatives to zero, thereby making the task computationally easier.

Other patents have described about Thermal mass flow meters. U.S. Pat. No. 6,539,791 issued to Weber describes about a calorimetric flow measuring device is characterized by a single thermistor for measuring flow. U.S. Pat. No. 6,628,202 issued to McQueen describes a thermal dispersion switch/transmitter for determining flow rate and liquid level in a non-contacting apparatus. U.S. Pat. No. 7,107,835 issued to Korniyenko describes about a thermal mass flow sensor is disclosed that includes a housing having a sensor region and a thin film temperature. U.S. Pat. No. 8,870,768 issued to Kasim describes about devices and methods useful for non-invasively measuring and indicating a rate of fluid flow.

Hence there is a need for fabrication of a reference volume containment with best feasible thermal connection between the surface area enhancing structures and the reference volume chamber walls. Suitable surface area enhancing structures may be formed integral with a body of starting material, while creating an interior void which functions as a fluid holding region within a reference volume chamber.

SUMMARY

Various embodiments include a flow controller system that comprises one or more sensors, a flow measurement sensor that comprises one or more sensors. A reference volume for use with pressure change flow rate measurement apparatus has an internal structure comprising elements with cross section and length comparable to the cross section and length of adjacent interstitial fluid regions.

In an embodiment of the disclosure, a reference volume body is described, for use with a pressure change flow rate measurement apparatus comprising one or more fluid holding regions having boundaries formed by interior body material elements with cross section and length similar to the cross section and length of immediately adjacent portions of the one or more fluid holding regions.

In another embodiment, a reference volume further including one or more heat conduction elements exterior to and in good thermal contact with at least a portion of a corrosion resistant material that forms the boundaries of at least one fluid holding region internal to the reference volume body. Wherein at least one heat conduction element is made from copper, or a copper alloy, or aluminum, or an aluminum alloy and the corrosion resistant material that forms the boundaries of a fluid holding region is made from a stainless-steel alloy, or a nickel-chromium alloy, or a cobalt-chromium alloy, or titanium, or tantalum. A good thermal contact for the reference volume is made by shrink fit of a heat conduction element around a corrosion resistant material, or brazing a heat conduction element to a corrosion resistant material.

In yet another embodiment, a reference volume for use with a pressure change flow rate measurement apparatus is described, including two or more bodies, at least one body including at least one fluid holding region having boundaries formed by corrosion resistant material elements with cross section and length similar to the cross section and length of immediately adjacent portions of the at least one fluid holding region, wherein at least two of the bodies are welded to each other and one or more heat conduction elements in good thermal contact with the exterior of a least one body.

In still yet another embodiment, a reference volume for use with a pressure change flow rate measurement apparatus including two or more bodies, at least one body comprising at least one fluid holding region having boundaries formed by corrosion resistant material elements with cross section and length similar to the cross section and length of immediately adjacent portions of the at least one fluid holding region, wherein one or more heat conduction elements are in good thermal contact with the exterior of a least two adjacent bodies and the two adjacent bodies are made from stainless steel and the one or more heat conduction elements are made from copper.

Alternative embodiments relate to other features and combinations of features as may be generally recited in the claims. Embodiments described below allow parallel or serial processing of each method and/or component.

In other embodiments, a reference volume can be designed so that heat conduction path lengths in the fluid, and heat conduction path lengths in the reference volume mechanical structure, have similar time constants. This can be done for a specific choice of gas and structural material, but in most instances, would be done to accommodate a group of gases (e.g. semiconductor process materials) and a particular structural material (e.g. stainless steel). The thermally conductive exterior second material is meant to enhance uniformity of temperature over the longer dimension(s) of the reference volume.

In alternative embodiments, a reference volume gets designed so any slice along a plane keeps the gas and metal heat paths optimized (primary claim) in two dimensions. The exterior jacket then makes the third dimension (length) relatively inconsequential. Besides internal fins and reference volume could merely be a bunch of parallel holes in a solid block, for example. But if there are too many holes in a cluster then you get the same kind of problems as fins that are too long. So optimized holes will have a diameter about the same as thickness of the remaining metal web between them and might be not more than five holes across entire bundle. The optimization process uses thermal diffusivity as a design consideration. Clearly other things like ability to measure mechanically, easy of fabrication, etc., may also be part of optimization.

Additionally, the flow controller work well by getting heat from concentrated sources (e.g. valve solenoid) distributed to everywhere (via thermal clamp onto reference volume) so there are nearly no temperature gradients within the whole device.

It should be understood that the summary above is provided to introduce in simplified form a selection of examples that are further described in the detailed description. It is not meant to identify key or essential features of any claimed subject matter that may later claim priority to the present description. Furthermore, the scope of any such claimed subject matter would not be limited to implementations that solve any disadvantages noted above or contained herein.

BRIEF DESCRIPTION OF DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Various embodiments are not limited in its application to the details of construction and the arrangement of components set forth in the following description or illustrated in the drawings. The invention is capable of other embodiments and of being practiced or of being carried out in various ways. Also, the phrasing and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The use of directional adjectives "inner, "outer," "upper," "lower," and like terms, are meant to assist with understanding relative relationships among design elements and should not be construed as meaning an absolute direction in space nor regarded as limiting.

Heat transfer through a non-crystalline homogeneous material may be characterized as a diffusion process whereby a local temperature difference drives heat energy from a region of higher temperature in the material into an adjacent region of lower temperature. The transfer of heat is impeded by a thermal resistance of the material which may equivalently be considered as the inverse of a thermal conductance. The amount of heat energy (typically measured as Joules, calories, BTU, or similar units) required to raise the temperature of a region of the material by a specific amount (typically measured in degrees Celsius, degrees Fahrenheit, or Kelvin) directly depends upon the mass of material in the region and the heat capacity of the material. Heat capacity of the material specified in terms of energy required to raise the temperature of a specific mass by a specific amount then requires knowledge of the material density to obtain an equivalent heat capacity for a specific volume of the material. For example, the heat capacity of pure water, at a pressure of one atmosphere and a starting temperature of 15 degrees Centigrade (15° C.), is one calorie per gram per degree Centigrade (cal/g*° C.), and one gram of water at that temperature occupies a volume of 1.0008722 cubic centimeters (density "rho"=0.9991286 gram/milliliter).

Consideration of the just described relationships matches a person's daily experience that a small amount of heat will make the small mass of air above a flame immediately hot while the substantial mass of a metal utensil must be held in the same flame for quite some time before the end away from the fire becomes hot. Daily experience also illustrates the low thermal conductivity of a wooden utensil makes the handle essentially never become hot while stirring boiling water and a metal utensil of high thermal conductivity in the same boiling water will eventually become entirely hot. The time rate at which a concentration of heat diffuses within a material body, thereby making temperature throughout the body more uniform, thus can be described as being related to the thermal diffusivity of the material:

$$\alpha = \kappa / \rho C_v$$ Equation 1.

"alpha equals kappa divided by product of rho multiplied by Cv"

where "alpha"=thermal diffusivity

"kappa"=thermal conductivity

"rho"=density

"Cv"=heat capacity at constant volume

In particular, Bracewell shows (The Fourier Transform and Its Applications, © 1965, McGraw-Hill, Inc.) a localized elevated temperature in a material body, as created by injecting an impulse of heat into the material body, will reduce according to a time factor:

$$SQRT\{1/(\alpha 4\pi t)\}$$ Equation 2.

"square root of the inverse product of alpha multiplied by four pi time"

For simple comparisons the square root of the inverse of alpha is sufficient:

$$tau = SQRT\{1/\alpha\}$$ Equation 3.

An examination of time constants for various materials calculated according to Equation 3 provides insight into the design of thermal stabilization structures intended for use in a reference volume in a pressure change flow rate determination apparatus. There are minor variations among reported material properties, such as heat capacity, in science and engineering literature but disagreements of a few percent are irrelevant when considering time factor values that differ by factors of four or five to one.

TABLE 1

| material | alpha (1 · atm) | SQRT{1/alpha} |
|---|---|---|
| C2F6 | 3.91E−06 | 505.5 |
| SF6 | 3.97E−06 | 501.7 |
| Cl2 | 9.79E−06 | 319.6 |
| CHF3 | 7.89E−06 | 356.1 |
| CF4 | 8.59E−06 | 341.3 |
| HBr | 1.14E−05 | 296.2 |
| Ar | 3.50E−05 | 169.1 |
| N2 | 3.06E−05 | 180.6 |
| O2 | 3.07E−05 | 180.6 |
| He | 2.92E−04 | 58.5 |
| CH4 | 4.97E−05 | 141.8 |

TABLE 1-continued

| material | alpha (1 · atm) | SQRT{1/alpha} |
|---|---|---|
| H2 | 2.11E−04 | 68.8 |
| CO | 2.95E−05 | 184.1 |
| CO2 | 1.39E−05 | 268.0 |
| Ag | 1.66E−04 | 77.7 |
| Au | 1.27E−04 | 88.7 |
| Cu | 1.11E−04 | 94.9 |
| 6061-Al | 6.40E−05 | 125.0 |
| 304SS | 4.20E−06 | 488.0 |
| 310SS | 3.35E−06 | 546.2 |
| Inconel 600 | 3.43E−06 | 540.1 |
| Mo | 5.43E−05 | 135.7 |
| Fe | 2.30E−05 | 208.5 |
| Si | 8.80E−05 | 106.6 |
| quartz SiO2 | 1.40E−06 | 845.2 |
| liquid H2O | 1.43E−07 | 2644.4 |
| Sn | 4.00E−05 | 158.1 |

As shown in Table 1, thermal diffusivity (alpha=m^2/sec) of some typical gases varies by about seventy-five to one and the corresponding time characteristic (tau=SQRT{1/alpha}) varies by about one to nine. Also shown in Table 1, thermal diffusivity (alpha) of some solids varies by about one-hundred-twenty to one and the corresponding time characteristic (tau) varies by about one to eleven. It is instructive to note thermal diffusivity of many gases at normal atmospheric conditions is similar to that of solids which might be considered materials of construction for a reference volume.

In particular, thermal diffusivity of stainless steels and corrosion resistant nickel alloys is nearly identical to thermal diffusivity of gases comprised of larger and/or heavier molecules. This relationship suggests an optimal heat exchange structure within a stainless-steel reference volume should have fins, or other surface area enhancing structures, with cross section and length similar to the portions of gas between those fins. Gases such as helium (He) and hydrogen (H2) can be very effective heat transfer mediums but a pressure change flow rate determination apparatus for generalized use must also be suitable for measuring common semiconductor industry gases such as chlorine (Cl2) and hexafluoroethane (C2F6).

If the thermal transfer aspect ratio of a fin is too high because of insufficient fin cross section and/or excessive fin length, then the time needed to reach thermal equilibrium along a fin will be excessive when compared to thermal stabilization of the intermingled gas. Perforated sheet metal or screen type heat exchange structures with long aspect ratios are likely to be ill suited for moving heat into or out of gas within a reference volume. The majority of a long aspect ratio structure will be too far from the reference volume walls to have any efficacy moving heat between the gas and the walls. If the fins are too thick then heat will not appropriately move from the middle of the fin bulk toward or away from its surface in contact with the gas. Likewise, excessive thermal aspect ratio between a heat sink (temperature stabilized) end of a reference volume and its central body may cause a temperature imbalance along the length of the reference volume. Excessive reference volume wall length will potentially cause significant temperature gradients along the length of a reference volume.

The thermal diffusivity of copper is about thirty times and aluminum about twenty times that of stainless steel; therefore, copper or aluminum would be much better materials of construction for a reference volume except for the potentially poor corrosion resistance. A superior reference volume design may use one or more copper or aluminum heat conduction elements in good thermal contact with the exterior (away from the process gas) of a reference volume to enhance temperature uniformity along the length of the reference volume. Heat conduction elements may bridge across weld joints, in a reference volume made from segments, so as to ensure good heat conduction across the joints.

Figure 1A:
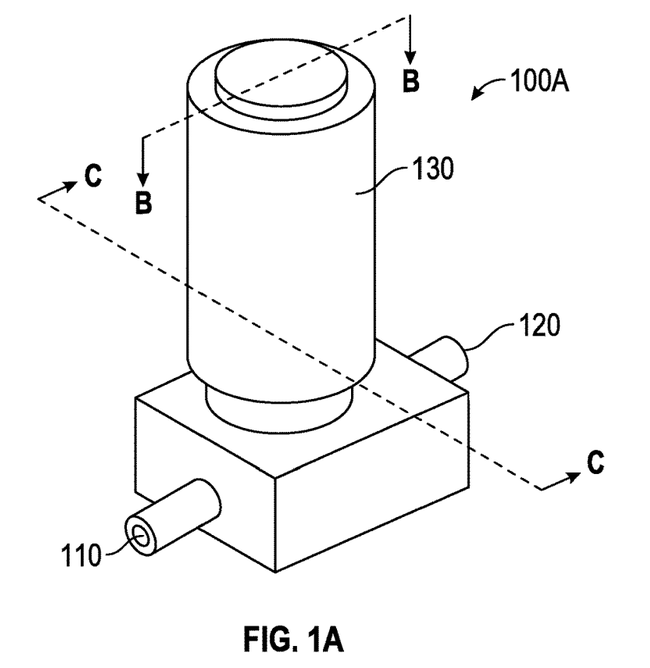
FIGS. 1A, 1B and 1C are schematic diagrams of a reference volume for use with pressure change flow rate measurement apparatus, according to an exemplary embodiment.

Turning to the drawings and, in particular, FIG. 1A illustrates a perspective view of a containment 100A for a reference volume in accordance with an exemplary embodiment. In general, the reference volume containment 100A includes an inlet portion 110, a outlet portion 120 and a reference volume chamber 130. A fluid and/or gas to be monitored enters the reference volume chamber through the inlet portion 110 and exits out from the outlet portion 120. The fluid and/or gas can include, but are not limited to common semiconductor industry gases such as Chlorine (Cl2) and Hexafluoroethane (C2F6), water vapor, Boron Trichloride (BCl3), Silane (SiH4), Argon and Nitrogen. The interior walls of the reference volume chamber being capable of welding on to one or more, thermal sensors, pressure sensors or PLCS (Programmable Logic Controllers Systems).

The fluid inlet portion 110 may be capable of receiving fluid from one or more sources. The reference volume chamber may be utilized as of one or more isolated individual reference volume chamber, or distributed as plumbing part among various portions of a pipeline, or a combination of plumbing and individual reference volume chambers. The inlet portion 110, outlet portion 120 and reference volume chamber 130 may be made from corrosion resistant alloy. The corrosion resistant alloy can include, but not limited to Chrome, Stainless steel, Cobalt, Nickel, Iron, Titanium and Molybdenum. Different factors considered while choosing the alloy composition are ranges of alloy composition, parameters of heat treatment, complex material mixture metallurgy, degradation mechanisms and joining considerations. The reference volume chamber 130 may receive the fluid and/or gas from the fluid inlet portion 110 and get in contact with other pressure/temperature sensors within the containment. The reference volume chamber 130 may perform the function of a thermal reservoir test cell during a rate of decay measurement of a fluid at constant temperature.

Figure 1B:
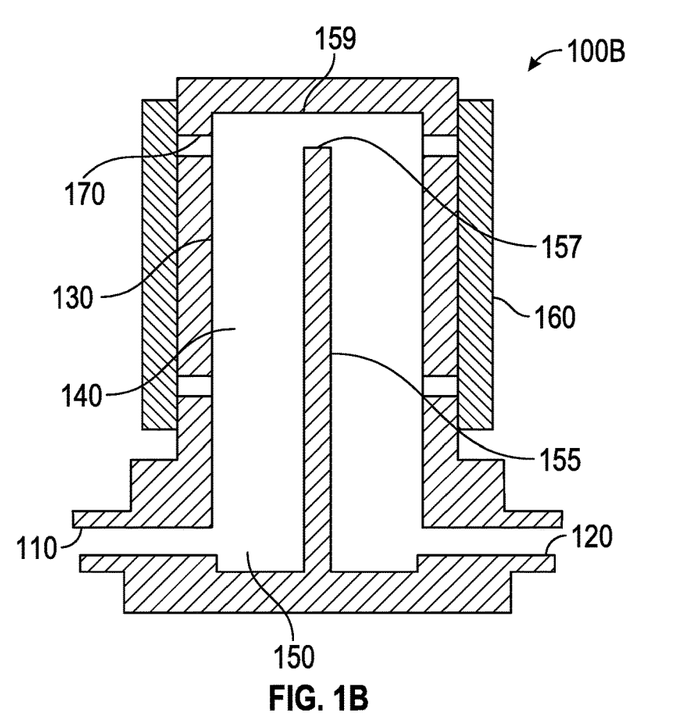

FIG. 1B describes a cross sectional view 100B along cutting plane B-B of FIG. 1. The gaseous fluid entering through the inlet portion 110, enters into the fluid holding region 140 and gets in contact with interior walls of the reference volume chamber 130 with a chamber base 150 and a chamber ceiling 159. The reference volume chamber 130 and thus the fluid holding region 140 is partly bifurcated by a central wall 155 extending from the chamber base 150 and not conjoined to the chamber ceiling 159, thereby creating a gap or pathway 157 for facilitating fluid movement from the inlet portion 110 to the outlet portion 120. The central wall 155 may be made from corrosion resistant alloy similar to the construction of the reference volume chamber 130. The corrosion resistant alloy can include, but not limited to Chrome, Stainless steel, Cobalt, Nickel, Iron, Titanium and Molybdenum.

The interior walls of the reference volume chamber or the central wall 155 may be secured with one or more pressure sensors, temperature sensors or welded on to one or more PCLS 170. The pressure sensor used may include, absolute pressure sensor, gauge pressure sensor, vacuum pressure sensor, differential pressure sensor and sealed pressure sensor. The temperature sensor used may include, a thermistor based sensor for accurate temperature measurements. The PLCS 170 welded on to the interior walls of the reference volume chamber and assist in monitoring the pressure change flow rate measurements for the gaseous fluid entering inside the reference volume chamber 130 through the inlet portion 110 and exiting out through the outlet portion 120. The programming languages used for the PLCS 170 may be, but not limited to, function block diagram (FBD), ladder diagram (LD), structured text (ST; similar to the Pascal programming language), instruction list (IL; similar to assembly language), and sequential function chart (SFC). These techniques emphasize logical organization of operations.

The exterior walls of the reference volume chamber are circumferentially enveloped by a heat conduction element cover 160. The gaseous fluid entering the gaseous fluid holding region 140, gets in contact with the reference volume chamber walls, thereby getting in contact with the pressure sensors, temperature sensor or the PLCS and makes it way out of the reference volume chamber through the outlet portion 120. The heat conduction element cover helps in maintaining a constant temperature for the fluid throughout the reference volume containment. A superior reference volume design may use one or more copper or aluminum heat conduction elements cover 160 in good thermal contact with the exterior (away from the process gas) of a reference volume to enhance temperature uniformity along the length of the reference volume. The heat conduction element may be attached to the exterior walls of the reference volume chamber by autogenous orbital welding of circular connections or electron beam welding of rectilinear and circular shapes or any suitable processes for sequential assembly of reference volume segments. The heat conduction element covers 160 helps in reducing excessive thermal aspect ratio between a heat sink (temperature stabilized) end of a reference volume chamber 130 and its central body leading to a temperature imbalance along the length of the reference volume. Especially in case of lengthy reference volume chamber 130 wall length, the heat conduction element covers 160, will potentially reduce significant temperature gradients along the length of a reference volume.

Many design choices and fabrication methods may be used to attach exterior heat conduction elements. In like manner, a reference volume chamber 130 may comprise a copper or aluminum body with a corrosion resistant material plated onto the surface of its interior fluid holding region 140. A reference volume chamber 130 may also comprise an interior fluid holding region defined by a corrosion resistant sheet metal shell with heat conducting material cast around its exterior. Other means of attaching one or more heat conduction elements 160 against the exterior of a reference volume chamber 130 include mechanical clamping, bonding with thermally conductive adhesive (such as loaded epoxy cement), brazing, or shrink fit of a tubular copper or aluminum portion on the outside of a cylindrical stainless steel portion that is inside. Shrink-fitting technique in which an interference fit is achieved by a relative size change after assembly is used to attach the heat conduction element 160 to the exterior walls of the reference volume chamber. This is usually achieved by heating or cooling one component before assembly and allowing it to return to the ambient temperature after assembly, employing the phenomenon of thermal expansion to make a joint. As the adjoined pieces reach the same temperature, the joint becomes strained and stronger.

Figure 1C:
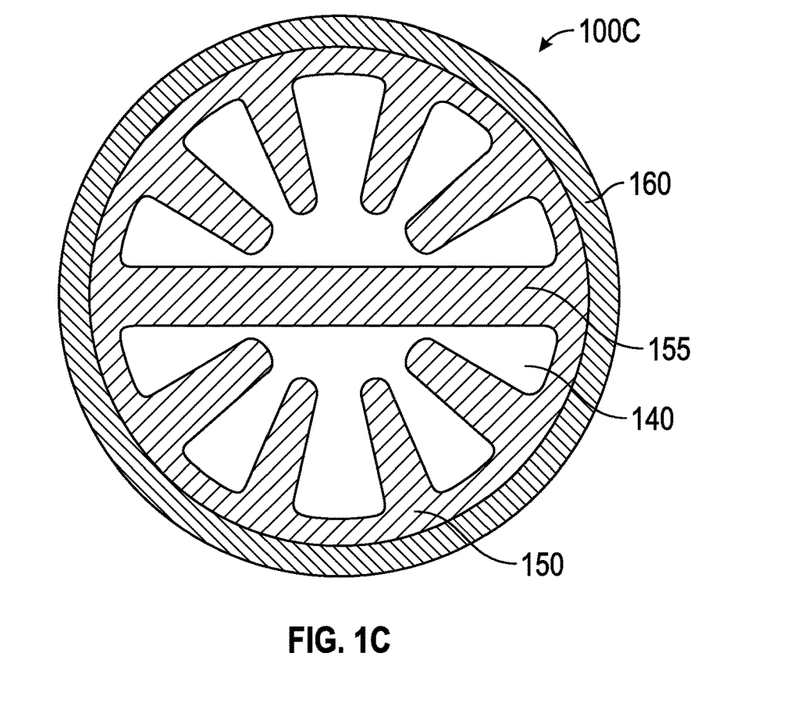

FIG. 1C describes a cross sectional view 100C along cutting plane C-C of FIG. 1. The heat conduction element covers 140 circumferentially enveloping exterior walls of the reference volume chamber can be visualized. The interior walls of the reference volume chamber 130 have a sine waved or an alternate trough and valley structured wall to give an enhanced surface area for contact for the gaseous fluid in the gaseous fluid holding region 140 with the interior walls of the reference volume chamber. It may be appreciated by anyone in the art that other surface structures for enhancing the surface area for better contact of the gaseous fluid can also be implemented in the scope of the invention.

In particular, thermal diffusivity of the base material for reference volume chamber 130, is nearly identical to thermal diffusivity of gases comprised of larger and/or heavier molecules. This relationship suggests an optimal heat exchange structure within a stainless-steel reference volume chamber should have fins, or other surface area enhancing structures, with cross section and length similar to the portions of gas between those fins. Optimum heat transfer requires fins or surfaces that extend from an object to increase the rate of heat transfer to or from the environment by increasing convection. The amount of conduction, convection, or radiation of an object determines the amount of heat it transfers. Increasing the temperature gradient between the object and the environment, increasing the convection heat transfer coefficient, or increasing the surface area of the object increases the heat transfer. Thus, adding a fin to an object, increases the surface area and reduces heat transfer problems.

If the thermal transfer aspect ratio of a fin is too high because of insufficient fin cross section and/or excessive fin length, then the time needed to reach thermal equilibrium along a fin will be excessive when compared to thermal stabilization of the intermingled gas. It is desirable to have the best feasible thermal connection between the surface area enhancing structures and the reference volume walls. Suitable surface area enhancing structures may be formed integral with a body of the reference volume chamber made of corrosion resistant alloy or stainless steel, while creating an interior void which functions as a fluid holding region 140 within a reference volume chamber 130. Fins may be formed by electric discharge machining (EDM—either wire or shaped electrode), milling, drilling, turning, or like material removal processes. Extruded stainless-steel shapes are may be used. A reference volume longer, or otherwise larger, than easily machined may be fabricated as sections which are welded together in sequence, by autogenous orbital welding of circular connections or electron beam welding of rectilinear and circular shapes are exemplary processes suitable for sequential assembly of reference volume segments.

In an alternative embodiment, the inner walls of the reference volume chamber can be maintained corrosion resistant by using wire mesh structures made of stainless steel. Generally, stainless steel a generic term used to describe a steel alloy with a chromium content of 10.5% or more. On the whole, stainless steels have a higher resistance to corrosion than plain or carbon steel. This resistance to corrosion in stainless steel is largely a result of the unique qualities of chromium. Chromium combines with oxygen in the atmosphere, naturally forming a thin layer of chromium oxide. This extremely thin and invisible film serves as a protective coating in a wide range of corrosive environments. If the metal is cut or scratched and the film is ruptured, more oxide will quickly "self-repair" itself as to form and recover the exposed surface. The different wire mesh, which can be used for corrosion resistance includes, but not limited to, T-304 stainless steel, T-316 stainless steel, T-310 SS, T-321 SS, T-347 SS, and even T-430 SS. Another of the many benefits of T-304 SS is heat resistance. T-304 SS displays good oxidation resistance to a temperature of approximately 1600oF in intermittent service and to a temperature of 1700oF in continuous service. T-304 stainless steel is also excellent for fabrication purposes—it can be formed and cut to size with appropriate tools and machinery. It can also be welded, using most common welding techniques, and it is virtually non-magnetic in the annealed condition. T-304 Stainless Steel is available in both woven and welded constructions.

Figure 2A:
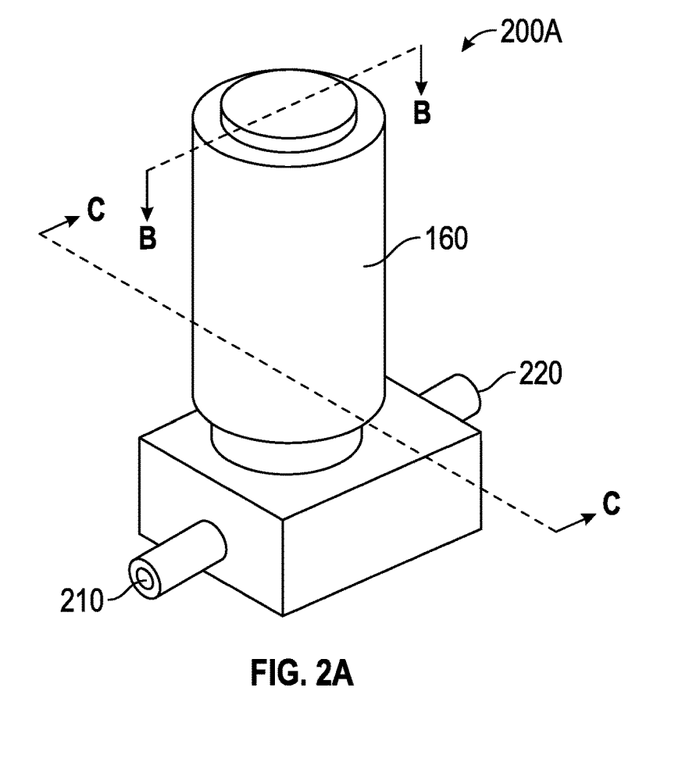
FIGS. 2A, 2B, 2C, 2D and 2E are schematic diagrams of a reference volume for use with pressure change flow rate measurement apparatus, according to an exemplary embodiment.

Referring to FIG. 2A, according to an exemplary embodiment, FIG. 2A illustrates a perspective view of a containment 200A for a reference volume. In general, the reference volume containment 200A includes an inlet portion 210, an outlet portion 220 and a reference volume chamber 230. A fluid and/or gas to be monitored enters the reference volume chamber through the inlet portion 210 and exits out from the outlet portion 220. The fluid and/or gas can include, but are not limited to common semiconductor industry gases or any other gas or gaseous mixture requiring monitoring. The interior walls of the reference volume chamber being capable of welding on to one or more, thermal sensors, pressure sensors or PLCS (Programmable Logic Controllers Systems) or any other monitoring sensor devices. The containment 200A is similar to containment 100A but differs in its internal structure for the fluid pathway.

The fluid inlet portion 210 may be capable of receiving fluid from one or more sources. or being connected to other reference volume chambers for continuous monitoring. The inlet portion 210, outlet portion 220 and reference volume chamber 230 may be made from corrosion resistant alloy. The corrosion resistant alloy can include, but not limited to Chrome, Stainless steel, Cobalt, Nickel, Iron, Titanium and Molybdenum. The reference volume chamber 230 may receive the fluid and/or gas from the fluid inlet portion 210 and get in contact with other pressure/temperature sensors within the containment.

Figure 2B:
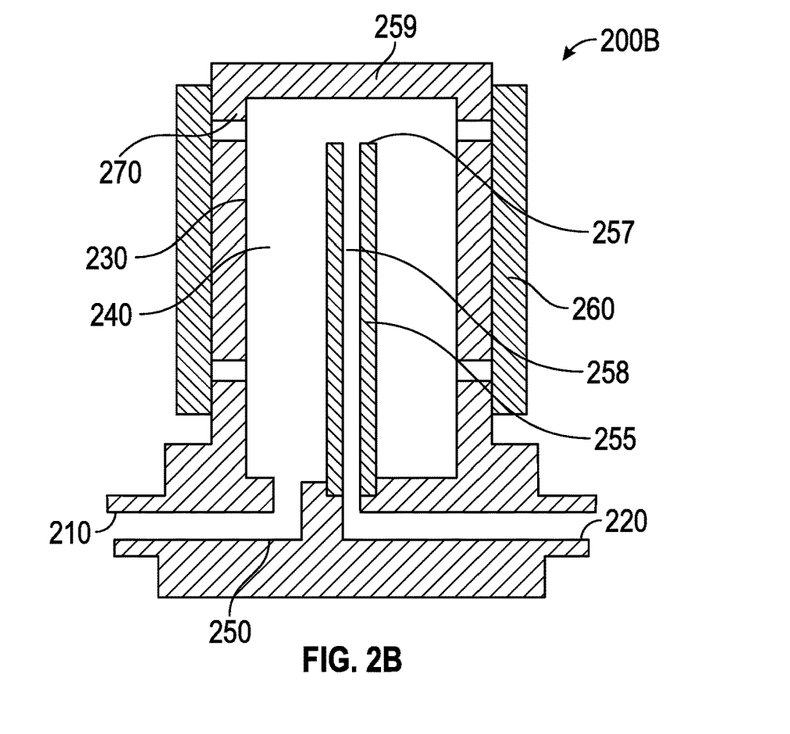

FIG. 2B shows a cross sectional view 200B along cutting plane B-B of FIG. 2. The gaseous fluid entering through the inlet portion 210, enters into the fluid holding region 240 and gets in contact with interior walls of the reference volume chamber 230 with a chamber base 250 and a chamber ceiling 259. The reference volume chamber 230 and thus the fluid holding region 240 is partly interfered by a central tubular structure 255 extending from the chamber base 250 and not conjoined to the chamber ceiling 259, thereby creating a gap or pathway 257 for facilitating fluid movement from the inlet portion 210 to the outlet portion 220. The central tubular structure 255 may be made from corrosion resistant alloy similar to the construction of the reference volume chamber 130. The corrosion resistant alloy may include, but not limited to Chrome, Stainless steel, Cobalt, Nickel, Iron, Titanium and Molybdenum.

The interior walls of the reference volume chamber or the central tubular structure 255 may be secured with one or more pressure sensors, temperature sensors or welded on to one or more PCLS 270. The exterior walls of the reference volume chamber are circumferentially enveloped by a heat conduction element cover 260. The gaseous fluid entering the gaseous fluid holding region 240, gets in contact with the reference volume chamber walls, thereby getting in contact with the pressure sensors, temperature sensor or the PLCS and makes it way out of the reference volume chamber through the outlet portion 220 via the central tubular structure 255 with a tubular pathway 258. The heat conduction element cover helps in maintaining a constant temperature for the fluid throughout the reference volume containment.

Figure 2C:
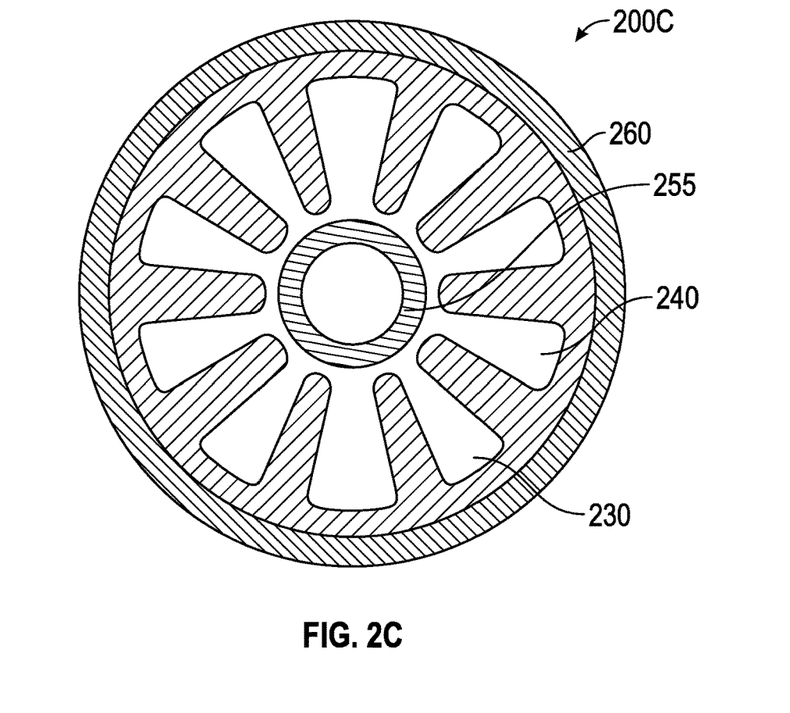

FIG. 2C describes a cross sectional view 200C along cutting plane C-C of FIG. 2. The heat conduction element covers 260 circumferentially enveloping exterior walls of the reference volume chamber can be visualized. The interior walls of the reference volume chamber 230 have a sine waved or an alternate trough and valley structured wall to give an enhanced surface area for contact for the gaseous fluid in the gaseous fluid holding region 240 with the interior walls of the reference volume chamber. It may be appreciated by anyone in the art that other surface structures for enhancing the surface area for better contact of the gaseous fluid can also be implemented in the scope of the invention.

The interior of the reference volume chamber 230 may be treated in alternative to avoid corrosion by employing corrosion inhibitors, which are chemicals that react with the metal's surface or the environmental gasses causing corrosion, thereby, interrupting the chemical reaction that causes corrosion. The corrosion inhibitors can work by adsorbing themselves on the metal's surface and forming a protective film. These chemicals can be applied as a solution or as a protective coating via dispersion techniques. The inhibitors process of slowing corrosion depends upon, changing the anodic or cathodic polarization behavior, decreasing the diffusion of ions to the metal's surface and increasing the electrical resistance of the metal's surface. The benefit of corrosion inhibitors is that they can be applied in-situ to metals as a corrective action to counter unexpected corrosion. Alternatively, organic coatings may be used to protect metals from the degradative effect of environmental gasses. Coatings are grouped by the type of polymer employed. Common organic coatings include, but not limited to alkyd and epoxy ester coatings that, when air dried, promote cross-link oxidation, two-part urethane coatings, acrylic and epoxy polymer radiation curable coatings, vinyl, acrylic or styrene polymer combination latex coatings, water-soluble coatings, high-solid coatings and powder coatings.

Figure 2D:
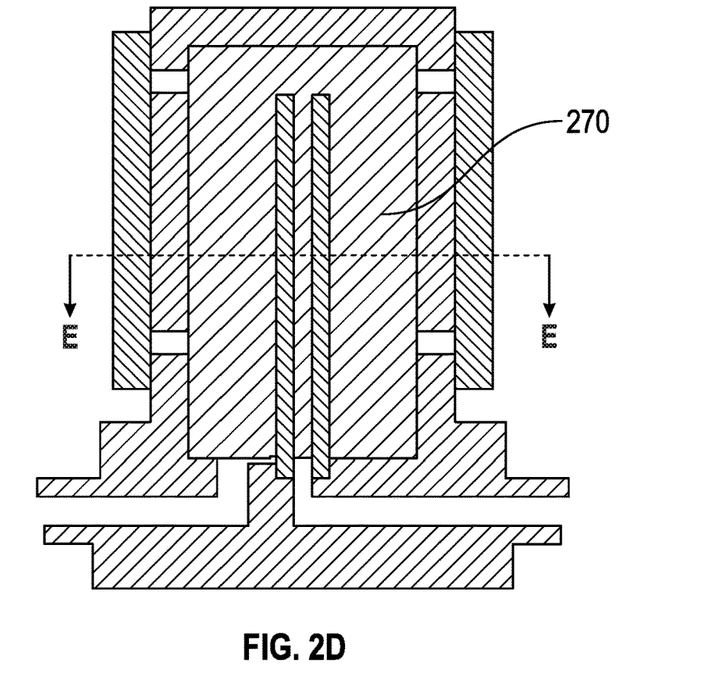
Figure 2E:
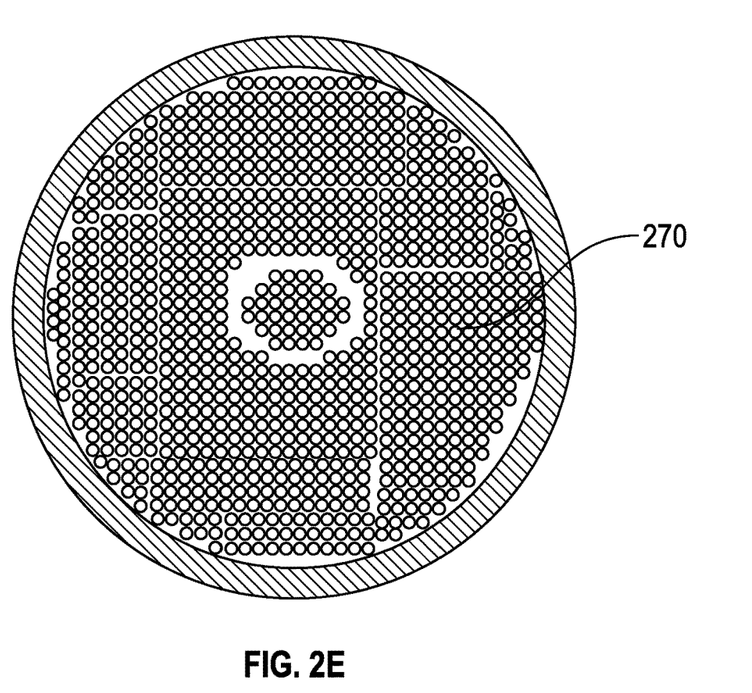

FIG. 2D illustrates another embodiment, where the reference volume chamber is full of vertical heat exchange tubes 270 that provide thermal mass and good surface area for heat exchange. In some embodiments, the tubes may not travel the entire length of the reference volume chamber, instead the tubes may be open at the top and bottom to allow the gas to permeate the entire volume of the reference volume. FIG. 2E illustrates a cross sectional area from FIG. 2D. The reference volume as circular tubes that pass through one or more quadrants of the reference volume chamber.

Figure 3A:
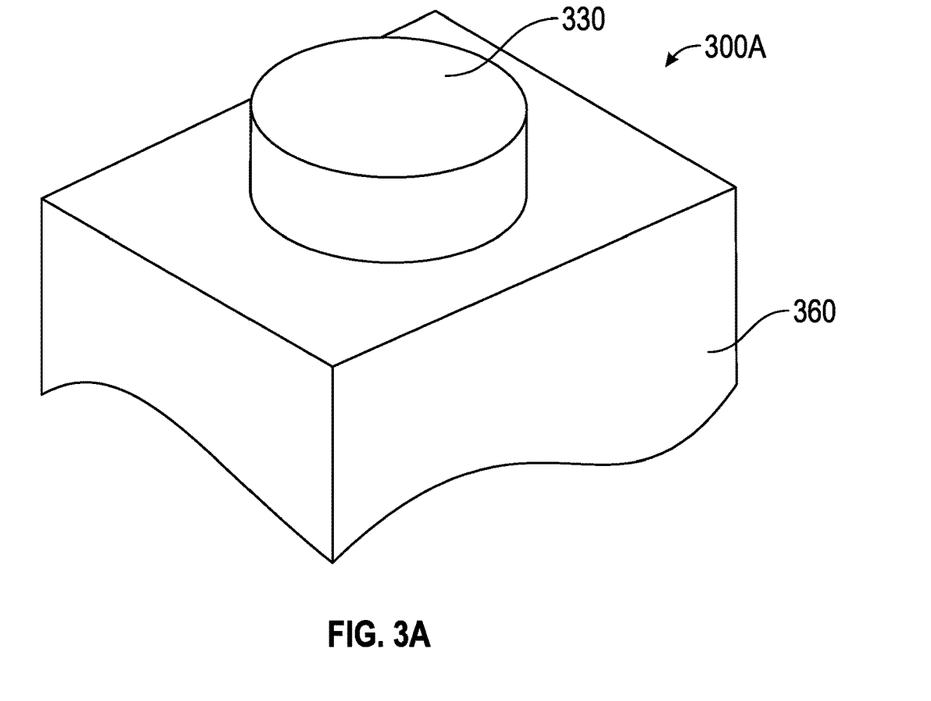
FIGS. 3A, 3B, 3C and 3D are schematic diagrams of a reference volume for use with pressure change flow rate measurement apparatus, according to an exemplary embodiment.

Referring to FIG. 3A, according to an exemplary embodiment, FIG. 3A illustrates a partial perspective view of a containment 300A for a reference volume. In general, the reference volume containment 300A includes a reference chamber 330 and heat conduction element cover 360. A fluid and/or gas to be monitored enters the reference volume chamber through an inlet portion (not shown) and exits out from the outlet portion (not shown). The fluid inlet and outlet portions can be designed as in containment 100A or as in containment 200A. The fluid and/or gas can include, but are not limited to common semiconductor industry gases or any other gas or gaseous mixture requiring monitoring. The interior walls of the reference volume chamber being capable of welding on to one or more, thermal sensors, pressure sensors or PLCS (Programmable Logic Controllers Systems) or any other monitoring sensor devices. The containment 300A is similar to containment 100A/200A but differs in its construction of the reference volume containment.

Figure 3B:
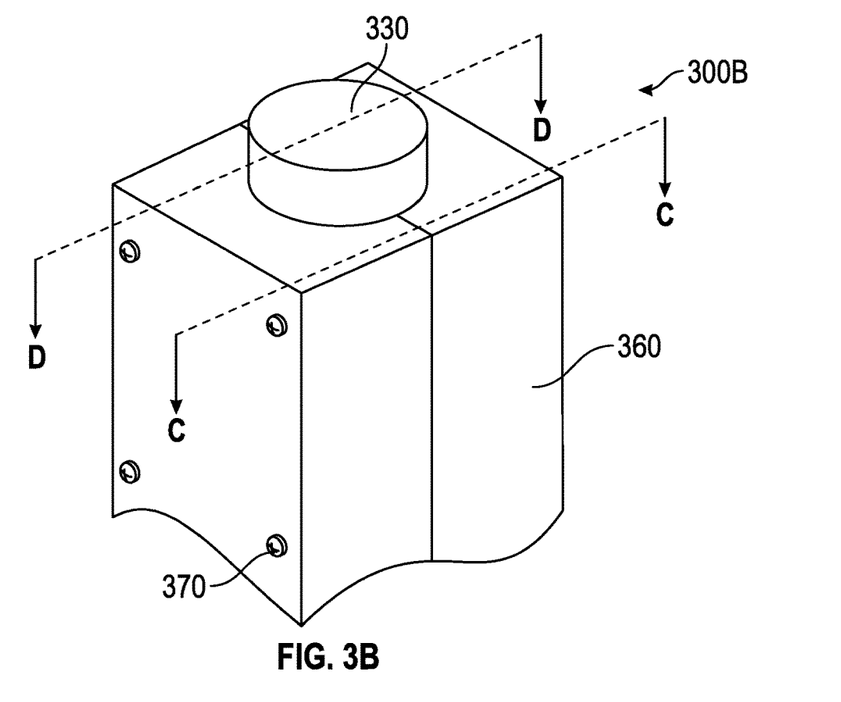

Referring to FIG. 3B, depicts an enlarged view 300B of containment 300A described in FIG. 3A. The reference volume chamber 330 is enveloped by a two-piece part of the heat conduction element cover 360. The two-piece parts of the heat conduction element cover 360 are designed such that they can aptly fit on the outer walls of the reference volume chamber 330.

Figure 3C:
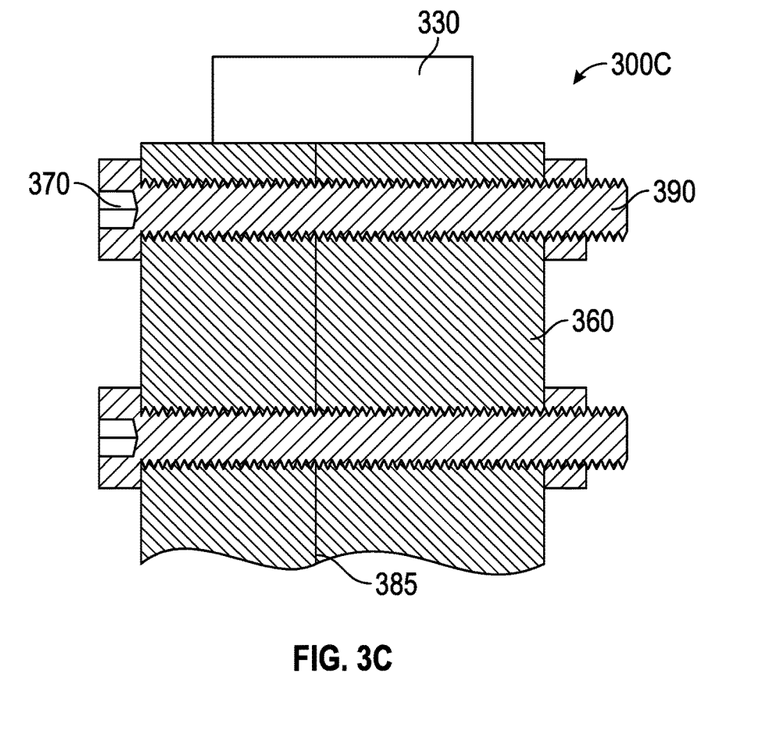

Referring to FIG. 3C, describes a cross sectional view 300C along cutting plane C-C of FIG. 3B. The reference volume chamber 330 is enveloped by a two-piece parts of heat conduction element cover 360 forming part line 385. The two-piece parts of heat conduction element cover 360 are fastened to each other by a pair of fasteners 390 on both sides and secured with one or more pressure sensors, temperature sensors or PLCS 370 for monitoring the gas flow through the reference volume chamber 330.

Figure 3D:
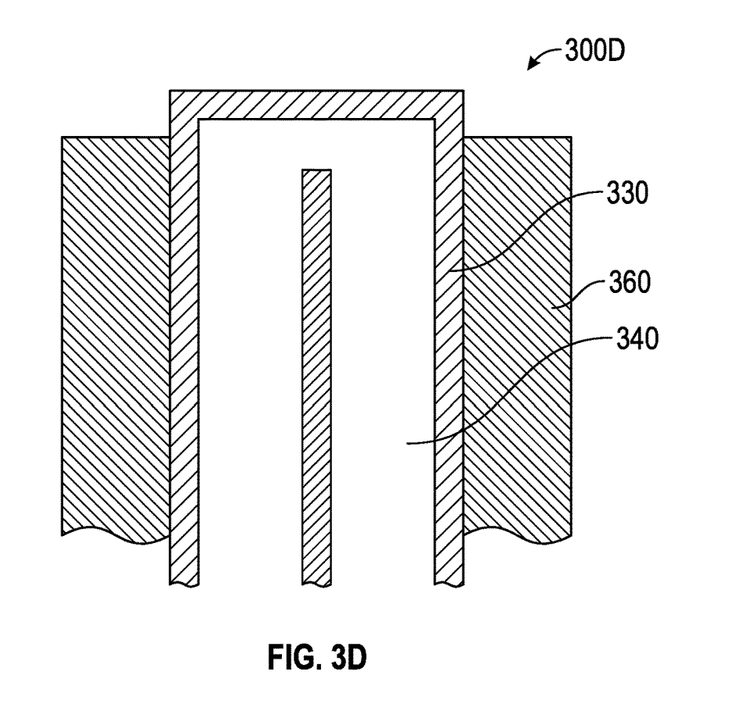

Referring to FIG. 3D, describes a cross sectional view 300D along cutting plane D-D of FIG. 3B. The reference volume chamber 330 includes a fluid holding region 340 for the facilitating a free movement for fluids. The fluid inlet and outlet portions can be designed as in containment 100A or as in containment 200A. the reference volume chamber is enveloped by the heat conduction element 360.

Figure 4A:
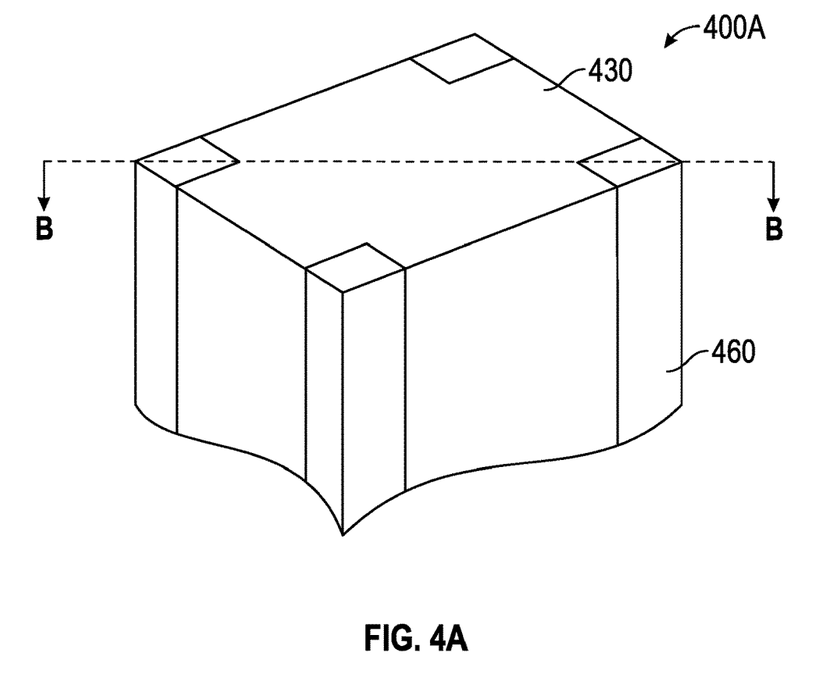
FIGS. 4A and 4B are schematic diagrams of a flow reference volume for use with pressure change flow rate measurement apparatus, according to an exemplary embodiment.

Referring to FIG. 4A, according to an exemplary embodiment, FIG. 4A illustrates a partial perspective view of a containment 400A for a reference volume. In general, the reference volume containment 400A includes a reference chamber 430 and heat conduction element cover 460 at the four corners of the reference volume chamber 430. A fluid and/or gas to be monitored enters the reference volume chamber through an inlet portion (not shown) and exits out from the outlet portion (not shown). The fluid inlet and outlet portions can be designed as in containment 100A or as in containment 200A.The fluid and/or gas can include, but are not limited to common semiconductor industry gases or any other gas or gaseous mixture requiring monitoring. The interior walls of the reference volume chamber being capable of fastened on to one or more, thermal sensors, pressure sensors or PLCS (Programmable Logic Controllers Systems) or any other monitoring sensor devices. The fasteners including, hardware devices that mechanically joins or affixes two or more objects together. In reference to the present invention, fasteners are used to create non-permanent joints; that is, joints that can be removed or dismantled without damaging the joining components. The containment 400A is similar to containment 100A/200A/300A but differs in its construction of the reference volume containment.

Figure 4B:
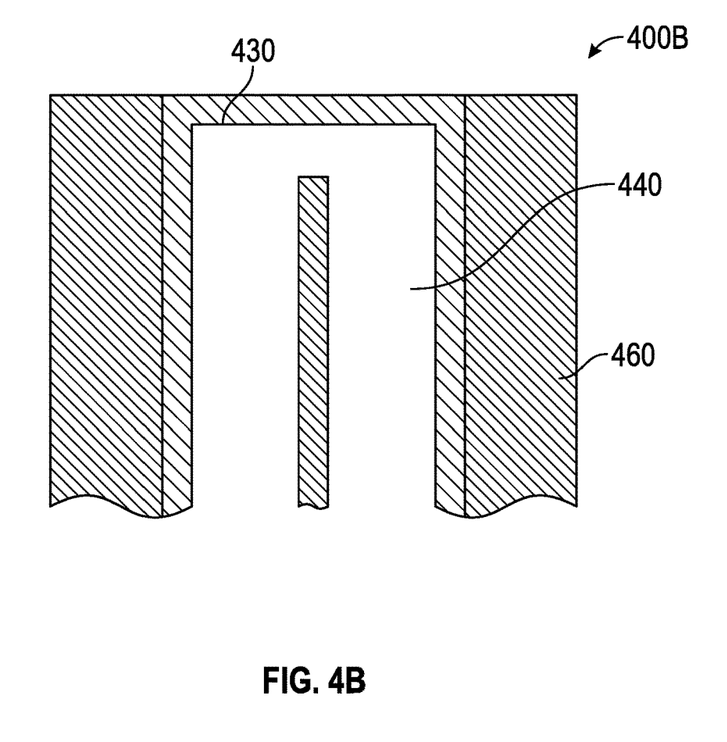

Referring to FIG. 4B, describes a cross sectional view 400B along cutting plane B-B of FIG. 4A. The reference volume chamber 430 is enveloped by a four-piece parts of heat conduction element cover 460 at the four corners of the reference volume chamber 430. The heat conduction element covers 460 at the four corners of the reference volume chamber 430 are secured with one or more pressure sensors, temperature sensors or PLCS for monitoring the gas flow through the reference volume chamber 430.

Figure 5A:
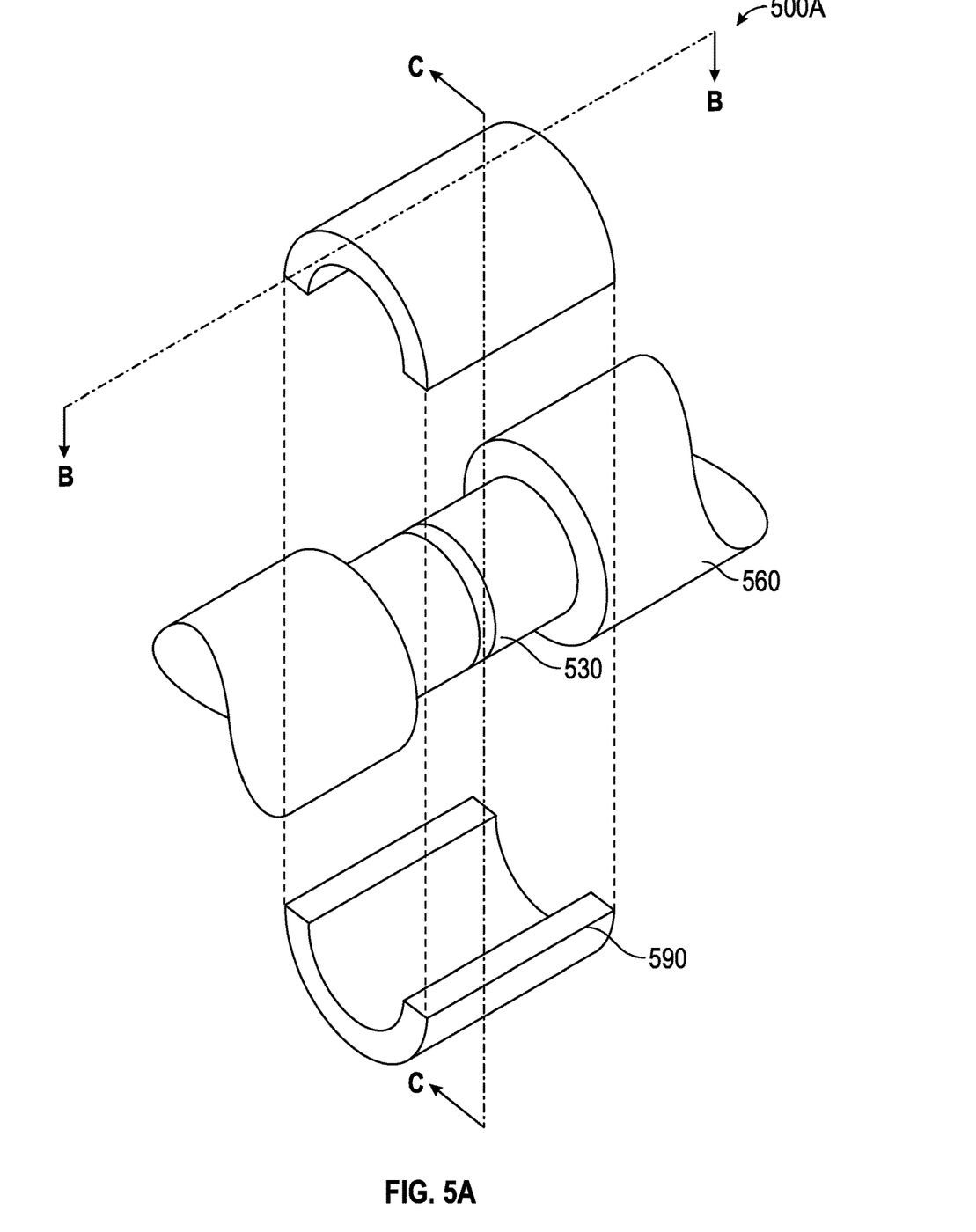
FIGS. 5A, 5B and 5C are schematic diagrams of a reference volume for use with pressure change flow rate measurement apparatus, according to an exemplary embodiment.

Referring to FIG. 5A, according to an exemplary embodiment, FIG. 5A illustrates a partial perspective view of a pipeline containment 500A for a reference volume. In general, the pipeline reference volume containment 500A includes a reference volume chamber 530 and heat conduction element cover 560 at the terminal ends of the pipeline reference volume chamber 530. Additionally, the pipeline reference volume can be wrapped with filler heat conduction elements 590 to drive the temperature to ambient temperatures that are outside the mass flow controller. A fluid and/or gas to be monitored enters the reference volume chamber through one end of pipeline and exits out from another end of pipeline. The fluid and/or gas can include, but are not limited to common semiconductor industry gases or any other gas or gaseous mixture requiring monitoring. The interior walls of the reference volume chamber being capable of welding on to one or more, thermal sensors, pressure sensors or PLCS (Programmable Logic Controllers Systems) or any other monitoring sensor devices. The containment 500A is similar to containment 100A/200A/300A/400A but differs in its construction of the reference volume containment.

Figure 5B:
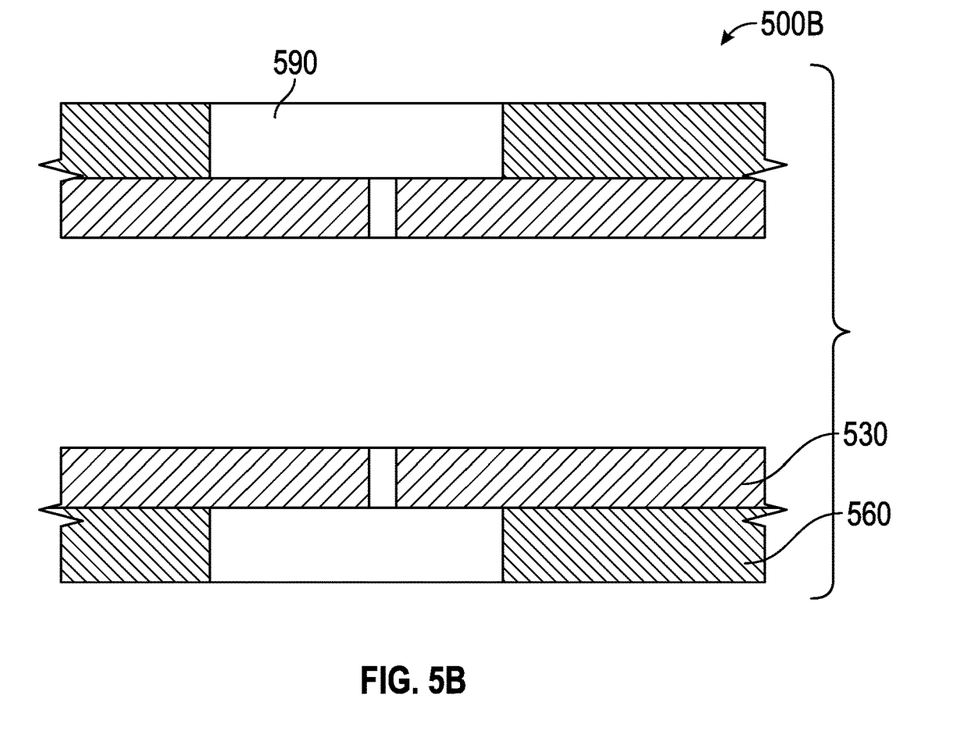

Referring to FIG. 5B, describes a cross sectional view 500B along cutting plane B-B of FIG. 5A. The reference volume chamber 530 is enveloped by a two-piece parts of filler heat conduction element cover 590 and all through the pipeline tubing by a heat conduction element cover 560. The heat conduction element covers 560 secured with one or more pressure sensors, temperature sensors or PLCS for monitoring the gas flow through the reference volume chamber 530.

Figure 5C:
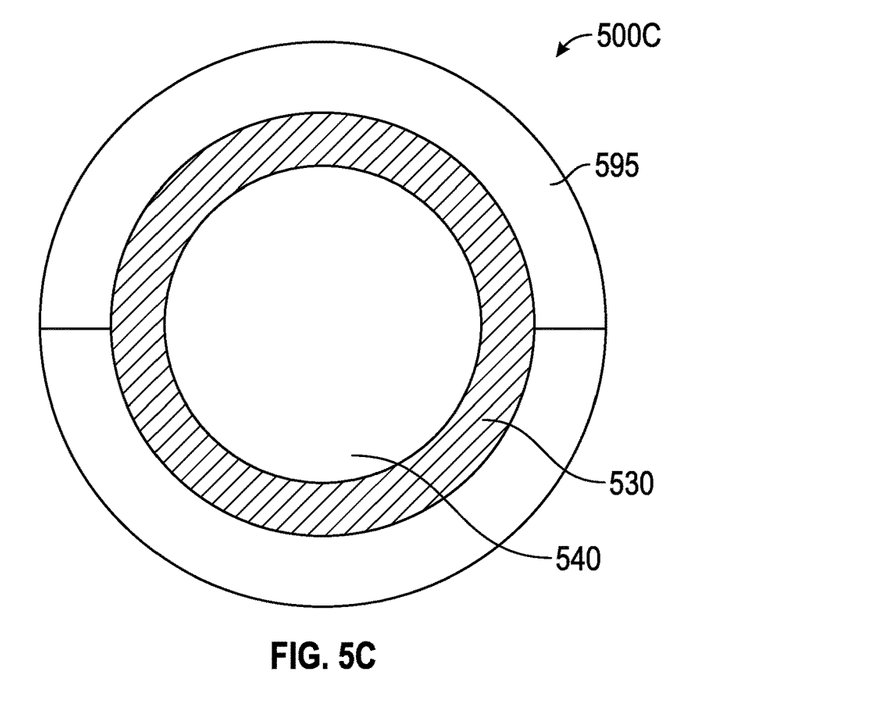

Referring to FIG. 5C, describes a cross sectional view 500C along cutting plane C-C of FIG. 5A. The pipeline reference volume chamber 530 includes a fluid holding region 540 for facilitating a free movement for fluids. The fluid inlet and outlet portions can be designed as in containment 100A or as in containment 200A. the reference volume chamber is enveloped by the heat conduction element 560.

Figure 6:
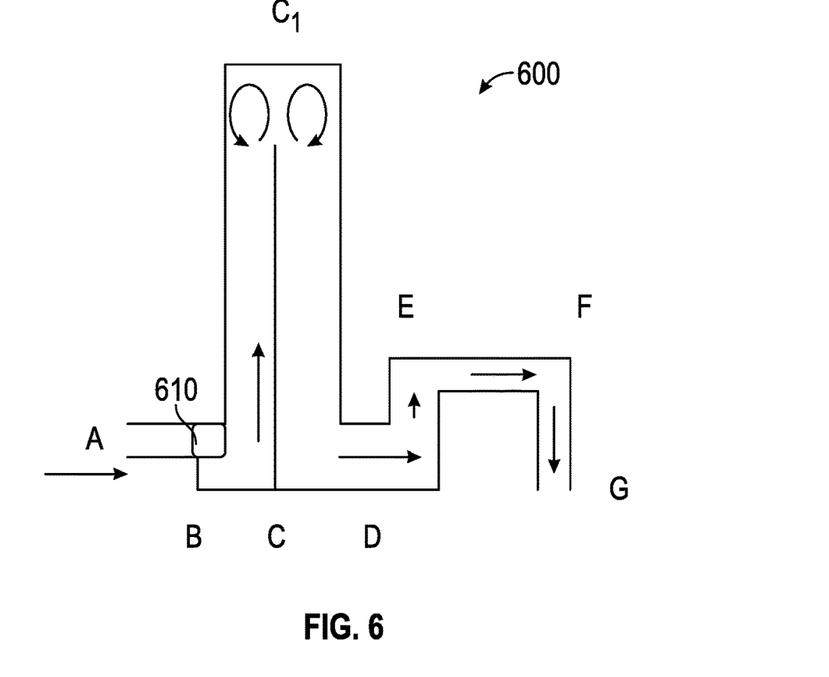
FIG. 6 illustrates a sample reference volume configuration.

Referring to FIG. 6, FIG. 6 describes a system 600, which can basically be combined with a flow control apparatus system. The flow pathway for the fluid entry into the system 600 begins with "A" and then along the direction of "B" and then to "C", where after the fluid is pushed along "C1" raising to the terminal end of "C1" and pours back downwards towards "D" and then moves along "E" and then to "F" and finally exits through "G". A flow transducer sensing element 610 is mounted perpendicular to the gas flow for making any required measurements. Flow transducers are used to measure fluid flow velocity. Flow transducers are based on analysis of the flow velocity, to calculate the flow level or determine the amount of flow within a chamber. The flow pathway described above can be implemented in any of the reference volume containment described in 100A/200A/300A/400A/500A.

An apparatus for reference volume measurements, includes a reference volume chamber, an interior region of the reference volume chamber comprising of an inlet portion, a bottom portion, a finned structured side wall and a central wall, that defines a fluid boundary for a fluid pathway for a fluid, entering through the inlet portion, sensed via a transducer element mounted orthogonal to the fluid pathway and exiting through the outlet portion of the reference volume chamber.

An apparatus for measurement of pressure including one or more pressure sensing elements, in a fluid pathway for a fluid, entering through the inlet portion, the fluid sensed via a transducer element mounted orthogonal to the fluid pathway and exiting through the outlet portion of the overall fluid pathway. In other words, the diaphragm is parallel to the flow of the gas while the length dimension of the transducer is perpendicular to gas flow.

Figure 7:
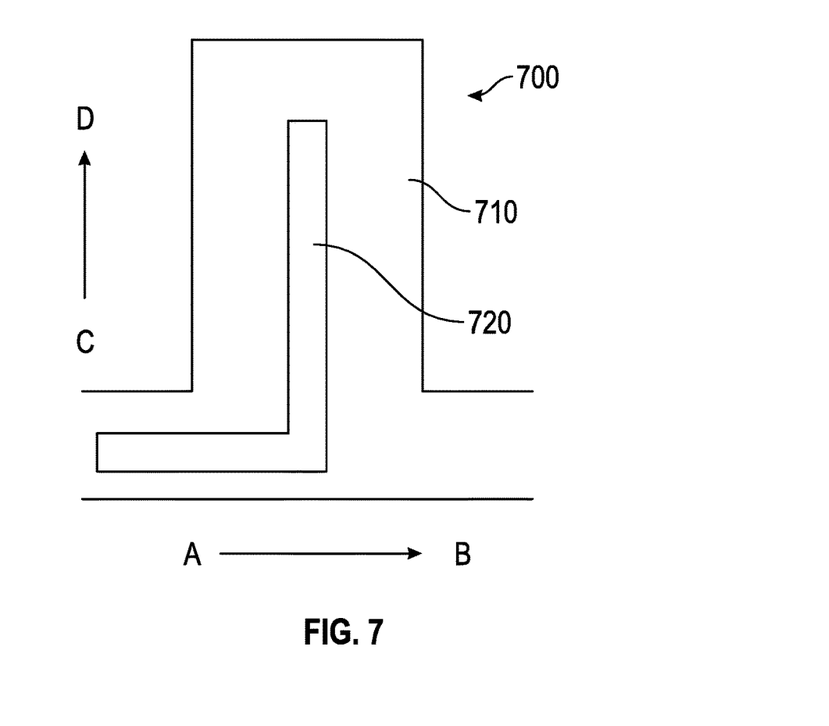
FIG. 7 illustrates a sample reference volume configuration.

Referring to FIG. 7, FIG. 7 describes a system 700, which shows the fluid pathway in an exemplary heat exchanger 710. An initial gas flow aligned in the direction A-B is deliberately diverted along a perpendicular direction along C-D to provide more residence time and more temperature stabilization by better heat exchange around a finned structure 720. The finned structure may be having a plain structure, which refer to simple straight-finned triangular or rectangular designs; herringbone structure, where the fins are placed sideways to provide a zig-zag path; and serrated and perforated which refer to cuts and perforations in the fins to augment flow distribution and improve heat transfer.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system, or a printer circuit board. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for reference volume measurements, comprising:
    a reference volume chamber with an inlet portion and an outlet portion for a fluid through the reference volume chamber;
    an interior region of the reference volume chamber having a bottom wall, a ceiling wall, a central wall and a side wall, wherein the side wall and the central wall extends from the bottom wall and not conjoined with the ceiling wall, thereby making a gap for fluid movement;
    an exterior wall of the reference volume chamber enveloped by a heat conduction cover for providing a thermal conduction so that the temperature is affected by ambient effects for the fluid in the reference volume chamber; and
    the central wall and the side wall capable of being secured with one or more sensors or programmable logic controllers (PLCs).

2. The system for reference volume measurements, as described in claim 1, wherein the one or more sensors is a thermal sensor chosen from a group comprising of Negative Temperature Coefficient (NTC) thermistor, Resistance Temperature Detector (RTD), Thermocouple or Semiconductor-based sensors.

3. The system for reference volume measurements, as described in claim 1, wherein the one or more sensors is a pressure sensor chosen from a group comprising of absolute pressure sensor, gauge pressure sensor, vacuum pressure sensor, differential pressure sensor or sealed pressure sensor.

4. The system for reference volume measurements, as described in claim 1, wherein the central wall has a tubular structure and connects directly to the outlet portion of the reference chamber.

5. The system for reference volume measurements, as described in claim 1, wherein the PLCs use programming languages from group comprising of function block diagram (FBD), ladder diagram (LD), structured text (ST; similar to the Pascal programming language), instruction list (IL; similar to assembly language) and sequential function chart (SFC).

6. The system for reference volume measurements, as described in claim 1, wherein the side wall has a finned structure, the central wall, the bottom wall and the ceiling wall are made of corrosion resistant alloy.

7. The system for reference volume measurements, as described in claim 1, wherein the interior side wall, the central wall, the bottom wall and the ceiling wall are treated with a corrosion resistant coating.

8. The system for reference volume measurements, as described in claim 1, wherein the side wall, the central wall, the bottom wall and the ceiling wall are covered with a corrosion resistant wire mesh.

9. The system for reference volume measurement, as described in claim 1, wherein the fluid is chosen from a group comprising of semiconductor industry gases such as Chlorine (Cl2) and Hexafluoroethane (C2F6), water vapor, Boron Trichloride (BCl3), Silane (SiH4), Argon and Nitrogen.

10. The system for reference volume measurement as described in claim 1, wherein the side wall, the central wall, the bottom wall and the ceiling wall are made of material chosen from a group comprising of Chrome, Stainless steel, Cobalt, Nickel, Iron, Titanium and Molybdenum.

11. The system for reference volume measurement as described in claim 1, wherein the heat conduction element is chosen from a group comprising of copper or aluminum.

12. The system for reference volume measurement as described in claim 1, wherein the heat conduction cover is attached to the exterior wall of the reference volume chamber by a method chosen from a group comprising of mechanical clamping, bonding with thermally conductive adhesive, brazing, or shrink fit methodologies.

13. The system for reference volume measurement as described in claim 1, wherein the reference chamber is fabricated as sections which are welded together in sequence, by autogenous orbital welding of circular connections or electron beam welding of rectilinear and circular shapes.

14. The system for reference volume measurement as described in claim 1, wherein the interior side wall, the central wall, the bottom wall and the ceiling wall are covered by a wire mesh chosen from a group comprising of T-304 stainless steel, T-316 stainless steel, T-310 SS, T-321 SS, T-347 SS or even T-430 SS.

15. The system for reference volume measurements as described in claim 1, wherein the system can be used an individual unit.

16. The system for reference volume measurements as described in claim 1, wherein the system can be employed as a part of complex unit comprising of one or more reference volume chambers.

17. The system for reference volume measurements as described in claim 1, wherein the system can be employed as a part of a pipeline structure.

18. The system for reference volume measurements as described in claim 17, wherein the system has one or more filler heat conduction cover in addition to the heat conduction cover.

* * * * *